Figure 1:
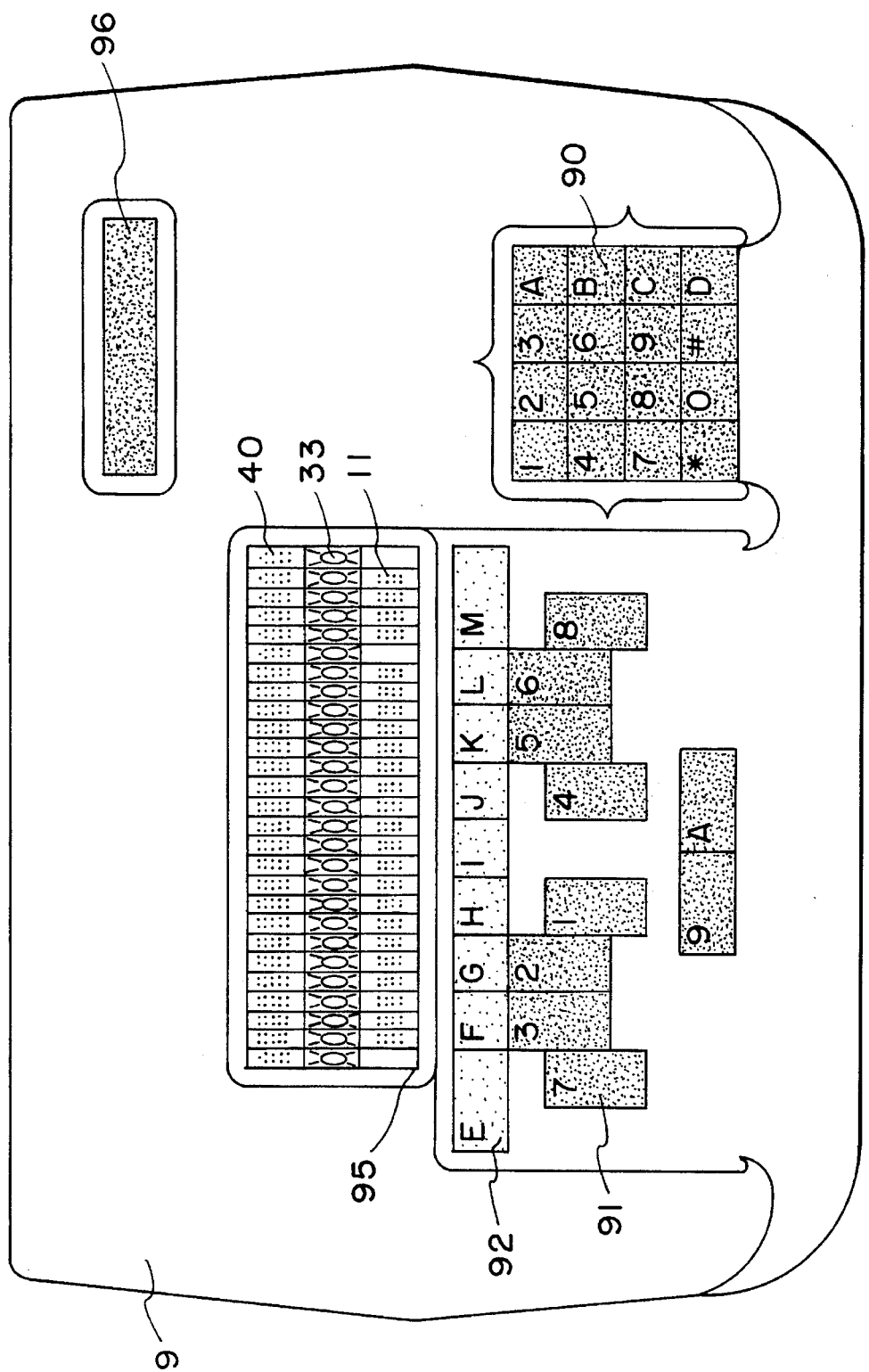

United States Patent [19]

Montane

[11] Patent Number: 5,557,269
[45] Date of Patent: Sep. 17, 1996

[54] INTERACTIVE BRAILLE APPARATUS

[76] Inventor: Ioan Montane, 34 rue du Général Brunet, F 75019 Paris, France

[21] Appl. No.: 296,401

[22] Filed: Aug. 26, 1994

[30] Foreign Application Priority Data

Aug. 27, 1993 [FR] France ................ 93 10326

[51] Int. Cl.⁶ .................................................. H03K 17/94
[52] U.S. Cl. .................... 341/22; 341/23; 341/27; 434/113; 434/115; 400/109.1
[58] Field of Search .................... 341/21, 23, 26–28, 341/22; 340/407.1, 407.2, 825.19; 434/231, 232, 233, 113, 114, 115, 116, 117; 400/109.1; 345/168, 169; 200/343

[56] References Cited

U.S. PATENT DOCUMENTS

| | | | |
|---|---|---|---|
| 4,326,195 | 4/1982 | Seki et al. | 341/22 |
| 4,416,178 | 11/1983 | Ishida | 341/22 |
| 4,488,146 | 12/1984 | Burchart | 340/407.1 |
| 4,801,768 | 1/1989 | Sugiyama et al. | 341/22 |
| 5,329,079 | 7/1994 | English et al. | 200/343 |

FOREIGN PATENT DOCUMENTS

| | | |
|---|---|---|
| 0061595 | 3/1982 | European Pat. Off. |
| 0284113 | 1/1988 | European Pat. Off. |
| 2655911 | 12/1989 | France |

OTHER PUBLICATIONS

IBM Technical Disclosure Bulletin, vol. 18, No. 12, May 1976 pp. 4150–4151.

*Primary Examiner*—John K. Peng
*Assistant Examiner*—Ashok Mannava
*Attorney, Agent, or Firm*—Dennison, Meserole, Pollack & Scheiner

[57] ABSTRACT

Adjacent tactile modules (10) together define a row of modifiable Braille cells (11), opposite a row of micro-switches (50), and opposite a row of covers (30). Each of the latter defines a pivoting tab (32) controlling the corresponding micro-switch, a tab connected by an undercut hinge (36) to a fixed part (31) bearing a fixed Braille information display area (40). At the free end of each tab (32), a bent lug (35) forms a stop with the underside of the associated micro-switch (50). On the back of each tab (32), a cylindrical transverse embossing ensures in-line contact with the micro-switch (50). Considered transversely, the series of pivoting tabs (32) exhibits a sinusoidal shape, this enabling a single tab to be actuated selectively with a broad finger. Also, each tab (32) is furnished with a longitudinal guiding rib, for steering the finger.

18 Claims, 2 Drawing Sheets

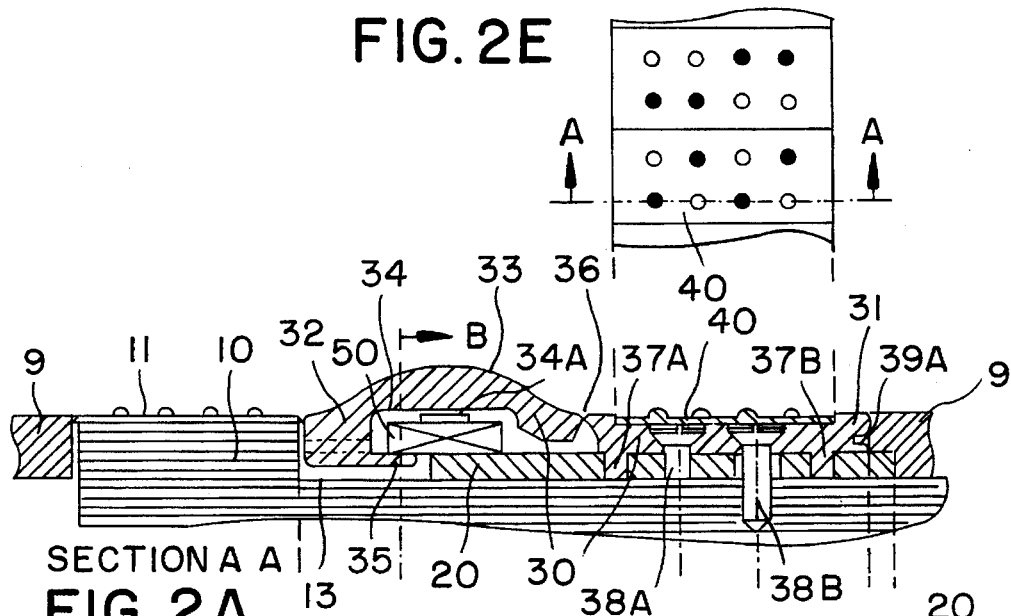
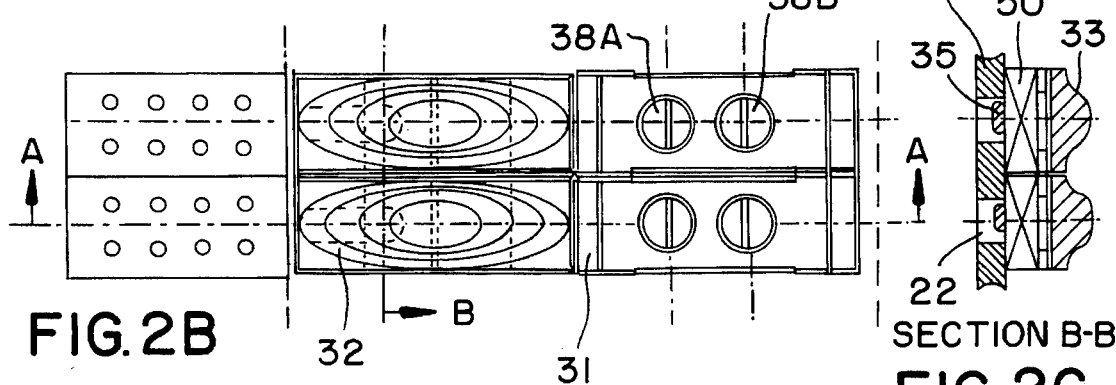
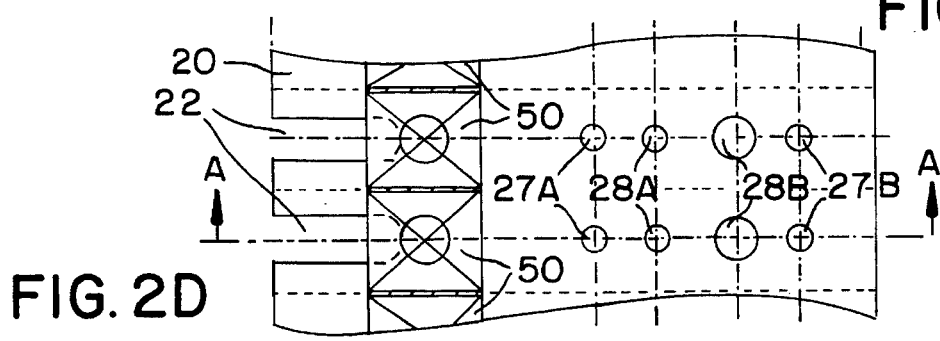

INTERACTIVE BRAILLE APPARATUS

The invention relates to aids for the blind in the sphere of computing.

It is acknowledged that a blind person manipulates a keyboard better than a sighted person. On the other hand, enabling him to perceive what is on a screen is a considerable problem.

A known solution consists in providing a Braille reading line, defined by a plurality of tactile modules adjacent to one another. It is known to operate such modules electrically so as to make them display a modifiable content on command, correspondingly with the screen for example.

Man/machine interaction also encompasses control of the cursor. It has been proposed that the calling-up of the cursor on the Braille cell be done by contacts placed in parallel on these operated Braille cells.

However, the room available to house these contacts is scanty; the known proposals therefore resort to ultra-flat or optical cell switches which are complex and tricky to engineer, this having the drawback of making the apparatuses of the prior art expensive and unreliable.

Morever numerous other problems arise, since the ergonomic conditions required when a blind person is working with a Braille apparatus are very substantially different from those usually encountered In many applications which use Braille apparatuses, identification of each cell is paramount as for example in a blind operator desk used in telephony.

The purpose of the present invention is to afford more satisfactory solutions.

The proposed device is of the aforesaid type, including a row of elongate tactile modules, placed side by side thicknesswise so as together to define a row of modifiable Braille cells, the emergence of micro-pins into each cell being controlled electrically by the relevant module, as well as a row of contacts placed opposite the modifiable Braille cells.

According to one aspect of the invention, the contacts are micro-switches, and there is provided a row of covers each of which defines a pivoting, preferably via an undercut hinge, tab controlling the corresponding micro-switch, a tab associated with a fixed part bearing an area displaying fixed information in Braille relating to the relevant modifiable Braille cell.

Advantageously, the display area receives a tape furnished, in the format of a Braille cell, with protruding embossed circles and with non-embossed circles, the two types of circle being differently filled in by silk-screen printing, so that the Braille cell can be read equally well by touch or visually.

In a noteworthy embodiment, the micro-switch type contacts are mounted on a common printed circuit laid transversely on the row of modules. Preferably, the printed circuit is furthermore provided with notches for passage of the bent end of the pivoting part of the cover and with holes which receive the feet of the fixed part of the cover and the fixing screw. The fixed part of each cover can then be provided with at least one foot for fixing to the printed circuit. Each tab can include at its free end a bent lug which forms a stop in co-operation with the underside of the associated micro-switch. The back of each tab can be furnished with a cylindrical transverse embossing to ensure in-line contact with the micro-switch.

According to another aspect of the invention, the series of tabs, considered transversely, exhibits a sinusoidal shape, this enabling a single tab to be actuated selectively with a finger of diameter markedly greater than the breadth of this tab. Moreover, each tab can be furnished with a longitudinal guiding rib, this allowing the steering of the finger so as to be able to pass from the modifiable Braille cell to the fixed Braille information area and vice versa.

Other characteristics and advantages of the invention will emerge from an examination of the detailed description below, and of the appended drawings, in which:

FIG. 1 is the schematic drawing of a Braille apparatus for the blind comprising the device of the invention; and FIGS. 2A to 2E are partial views which correspond and together show the interaction of the elements according to the invention, with a plan view (2B), a longitudinal section through the line A—A (2A), a transverse section through the line B—B (2C), a cleared plan view (2D), and a view of a tape (2E).

The appended drawings include elements of a definite character. Accordingly, they are to be regarded as an integral part of the description, and may serve not only to elucidate the latter, but also to contribute to defining the invention, as appropriate.

In FIG. 1, the apparatus comprises a numeric pad 90, a Braille keyboard 91, a row of function keys 92, and at 95 the visible part of the device according to the. invention, and a liquid-crystal display 96.

This device comprises a tactile module 10 (FIG. 2A), which is for example the SC2 model sold by the Japanese Company K.G.S. located at 2-25-7 Higashino, Urayasu City 79. The area 11 thereof, which defines a Braille cell, is modifiable with the aid of 8 pistons whose displacement is controlled electrically.

In FIG. 2A, a series of modules 10 is placed side by side, this being shown schematically by two modules in FIG. 2B. On their face 13 is placed firstly a printed circuit 20, furnished with micro-switches 50 (FIG. 2D). Opposite each module 10, the printed circuit 20 receives a row of covers such as 30 and the row of covers thus defined receives a self-adhesive tape 40, as will be seen below. The assembly can be bounded by the external wall 9 of the casing of the relevant Braille apparatus.

The printed circuit 20 is a double-sided printed circuit arranged to allow matrix addressing of micro-switches such as 50. Opposite each micro-switch the printed circuit defines one or more holes for centering studs such as 27A and 27B, one or more fixing holes such as 28A and 28B and a notch 22 for passing the bent end or lug 35 of the pivoting part of the cover 30.

In FIGS. 2A to 2C, the structure of each of the covers 30 is represented more clearly.

Such a cover 30 includes a fixed part 31, joined by an undercut hinge 36 to a movable part or tab 32. On top, the tab 32 includes a boss 33 whose profile transverse to the plane of the figure has a sinusoidal shape. Underneath, the tab 32 is recessed at 34 in order to house the micro-switch 50; it includes an embossing 34A for ensuring faithful control of the contact of the micro-switch. At the free end of the pivoting tab 32, and underneath, there is provided a bent end or lug 35 which will be placed under the micro-switch 50, in order to stop the tab 32.

As for the fixed part 31, this includes two pins 37A and 37B capable of being housed in the matching recesses such as 27A and 27B (FIG. 2D) of the printed circuit 20. It also defines a dished location for the tape 40 to which we shall return later. In this location are provided one or more holes 28, 28B for fixing screws 38, 38B which grip, either on the printed circuit 20 alone (38A), or on the body of the underlying module 10 (38B).

FIGS. 2A and 2C show that the bent end or lug 35 also passes through an elongate notch 22 in the printed circuit 20.

The tape 40 (FIG. 2E) is a flat self-adhesive tape furnished, in the format of a Braille cell, with protruding embossed circles and with non-embossed circles, the two types of circle being differently filled in by silk-screen printing, so that the information of the Braille cell can be read equally well by touch or visually.

It will also be observed that boss or area 33 of each tab defines a longitudinal guiding rib, which enables the finger of the blind person to be steered so as to pass from the modifiable Braille cell 10 to the corresponding fixed Braille information area and vice versa, while also being able to control in passing the micro-switch associated with these two pieces of information.

The setup is particularly compact and convenient, since the covers 30 are flush with the surface of the modifiable Brialle cells 11 and are housed between these modifiable Braille cells and the fixed part 31 provided with the tape 40 bearing the fixed Braille information. The fixed or endmost part 31 of the cover 30 may optionally be furnished with a notch 39A which enables the wall of the Braille apparatus to be inserted therein and the cover 30 to be removed for maintenance purposes.

The presence will be noted in FIG. 1 of "blind" Braille cells, that is to say ones for which only the contact and the fixed Braille information exist.

I claim:

1. A device forming an interactive Braille apparatus for the blind, comprising:

a row of tactile modules (10) disposed side by side thicknesswise so as together to define a row of modifiable Braille cells (11), each cell including a plurality of micro-pins moveable between extended and retracted positions with respect to the tactile module, the movement of said micro-pins in each cell being controlled electrically by a respective one of the tactile modules;

a row of contacts, one for each modifiable Braille cell and operatively positioned opposite each of said modifiable Braille cells, wherein the contacts comprise micro-switches (50);

a row of covers (30), each of said covers including a pivoting tab (32) terminating in a bent end (35) controlling a respective one of the micro-switches, each of said covers having a fixed part (31) defining an area (40) for displaying, in Braille, information relating to a respective one of the modifiable Braille cells;

a common printed circuit board (20) positioned transversely of and common to each module on the row of modules, said micro-switches being mounted on said common printed circuit board; and wherein said common printed circuit board (20) includes notches (22) and apertures (27, 28) configured and positioned to accommodate, said pivoting tabs of said covers and said bent ends (35) for passage through said notches, said fixed part of each of said covers including pins (37A, 37B) received within a selected aperture (27), and fastening means securing said fixed parts and said common printed circuit board together.

2. The device as claimed in claim 1, wherein each of said covers include an undercut hinge between the pivoting tab and the fixed part of said each of said covers.

3. The device as claimed in claim 2, wherein the area (40) receives a tape provided in the format of a Braille cell with protruding embossed circles and with non-embossed circles comprising different printing of each of said two different types of circles, whereby the Braille cell is read equally well by touch or visually.

4. The device as claimed in claim 3, including a common printed circuit (20) disposed beneath said contacts, said micro-switches (50) being mounted on said common printed circuit.

5. The device as claimed in claim 1, wherein said fixed part (31) of each of said covers is provided with means for fixing said fixed part to said common printed circuit (20).

6. The device as claimed in claim 1, wherein each of said pivoting tabs includes a free end, one of said bent ends being formed at each said free end and defining a stop cooperating with an underside of a respective one of the micro-switches (50).

7. The device of claim 1, wherein each of said pivoting tabs (32) includes a portion provided with a cylindrical transverse embossing to ensure in-line contact with a respective one of the micro-switches (50).

8. The device of claim 1, wherein, when viewed transversely, the pivoting tabs (32) provide a sinusoidal shape enabling each of said pivoting tabs to be actuated selectively by a finger of a user even if a diameter of the finger is substantially greater than a breadth of the pivoting tab.

9. The device of claim 1, wherein each of said pivoting tabs includes a longitudinal guiding rib allowing guided movement of a finger of a user for movement between a modified Braille cell and said area for displaying information in Braille.

10. The device claimed in claim 1, wherein said fixed part (31) of each of said covers is provided with means for fixing said fixed part to said common printed circuit.

11. A device forming an interactive Braille apparatus for the blind, comprising:

a row of tactile modules (10) disposed side by side thicknesswise so as together to define a row of modifiable Braille cells (11), each cell including a plurality of micro-pins moveable between extended and retracted positions with respect to the tactile module, the movement of said micro-pins in each cell being controlled electrically by a respective one of the tactile modules;

a row of contacts, one for each modifiable Braille cell and operatively positioned opposite each of said modifiable Braille cells, wherein the contacts comprise micro-switches (50);

a row of covers (30), each of said covers including a pivoting tab (32) terminating in a bent end (35) controlling a respective one of said micro-switches, each of said covers having a fixed part (31) defining an area (40) for displaying, in Braille, information relating to a respective one of the modifiable Braille cells; each of said covers including undercut hinges between the tab and said fixed part of each cover;

a common printed circuit board positioned transversely of and common to each module on the row of modules, said micro switches being mounted on said common printed circuit board, said common printed circuit board is provided with notches (22) and with apertures (27, 28) configured and positioned to accommodate said pivoting tabs of said covers and said bent ends (35) for passage through said notches, said fixed part of each of said covers including pins (37A, 37B) received within a selected aperture (27) and fastening means securing said fixed parts and said common printed circuit board together; and wherein said display area (40) receives a template tape in the format of a Braille cell, including protruding Braille embossed circles and visual circles which comprise different presentations of each of said two different types of circles, whereby the Braille cell is recognized equally well visually or by touch.

12. The device of claim 11, including a common printed circuit (20) disposed beneath said contacts and positioned transversely on the row of modules; and wherein said micro-switches (50) being mounted on said common printed circuit.

13. The device of claim 11, wherein said fixed part (31) of each of said covers includes at least one portion for attachment to said common printed circuit, and each tab (32) includes a free end portion with a bent end portion (35) thereby defining a stop cooperating with the respective micro-switch (50).

14. A device forming an interactive Braille apparatus for the blind, comprising:

- a row of tactile modules (10) disposed side by side thicknesswise so as together to define a row of modifiable Braille cells (11), the emergence of micro-pins into each cell being controlled electrically by a respective one of the tactile modules;
- a row of contacts, one for each modifiable Braille cell, disposed opposite said each modifiable Braille cell, wherein the contacts comprise micro-switches (50); and
- a row of covers (30), each of said covers defining a pivoting tab (32) controlling a respective one of the micro-switches, each of said covers having a fixed part (31) having an area (40) for displaying, in Braille, information relating to a respective one of the modifiable Braille cells;
- wherein each of said pivoting tabs includes a free end, a bent end being formed at each said free end and defining a stop cooperating with an underside of a respective one of the micro-switches (50).

15. The device of claim 14 wherein each of said pivoting tabs (32) includes a portion provided with a cylindrical transverse embossing to ensure in-line contact with a respective one of the micro-switches (50).

16. The device of claim 14, wherein, when viewed transversely, the pivoting tabs (32) provide a sinusoidal shape enabling each of said pivoting tabs to be actuated selectively by a finger of user even if a diameter of the finger is substantially greater than a breadth of the pivoting tab.

17. The device of claim 14, wherein each of said pivoting tabs includes a longitudinal guiding rib allowing guided movement of a finger of a user for movement between a modified Braille cell and said area for displaying information in Braille.

18. A device forming an interactive Braille apparatus for the blind, comprising:

- a row of tactile modules (10) disposed side by side thicknesswise so as together to define a row of modifiable Braille cells (11), each cell including a plurality of micro-pins moveable between extended and retracted positions with respect to the tactile module, the movement of said micro-pins in each cell being controlled electrically by a respective one of the tactile modules;
- a row of contacts, one for each modifiable Braille cell and operatively positioned opposite each of said modifiable Braille cells, wherein the contacts comprise micro-switches (50);
- a row of covers (30), each of said covers including a pivoting tab (32) terminating in a bent end (35) controlling a respective one of the micro-switches, each of said covers having a fixed part (31) defining an area (40) for displaying, in Braille, information relating to a respective one of the modifiable Braille cells;
- each of said covers including undercut hinges between the tab and said fixed part of each cover;
- a common printed circuit board positioned transversely of and common to each module on the row of modules, said micro-switches being mounted on said common printed circuit board, said common printed circuit board is provided with notches (22) and with apertures (27, 28) configured and positioned to accommodate said pivoting tabs of said covers and said bent ends (35) for passage through said notches, said fixed part of each of said covers including pins (37A, 37B) received within a selected aperture (27), and fastening means securing said fixed parts and said circuit board together;
- wherein said display area (40) receives a template tape in the format of a Braille cell, including protruding Braille embossed circles and visual circles which comprise different presentations of each of said two different types of circles, whereby the Braille cell is read equally well by touch or visually; and
- wherein each of said pivoting tabs includes a free end portion and a bent end portion, said bent end portion defining a stop cooperating with a respective one of the micro-switches (50).

* * * * *